US007774833B1

(12) United States Patent
Szeto et al.

(10) Patent No.: US 7,774,833 B1
(45) Date of Patent: Aug. 10, 2010

(54) SYSTEM AND METHOD FOR PROTECTING CPU AGAINST REMOTE ACCESS ATTACKS

(75) Inventors: Ronald W. Szeto, Pleasanton, CA (US); Philip Kwan, San Jose, CA (US); Raymond Wai-Kit Kwong, Los Altos, CA (US)

(73) Assignee: Foundry Networks, Inc., San Jose, CA (US)

( * ) Notice: Subject to any disclaimer, the term of this patent is extended or adjusted under 35 U.S.C. 154(b) by 2068 days.

(21) Appl. No.: 10/668,455

(22) Filed: Sep. 23, 2003

(51) Int. Cl.
*H04L 29/06* (2006.01)
*G06F 21/00* (2006.01)

(52) U.S. Cl. .................. 726/13; 713/154; 713/162; 726/14

(58) Field of Classification Search ............ 713/153, 713/154, 160, 162; 709/221, 225, 229, 232, 709/242; 726/13–15
See application file for complete search history.

(56) References Cited

U.S. PATENT DOCUMENTS

| 4,897,874 | A | 1/1990 | Lidinsky et al. |
| 5,237,614 | A | 8/1993 | Weiss |
| 5,721,780 | A | 2/1998 | Ensor et al. |
| 5,757,924 | A | 5/1998 | Friedman et al. |
| 5,774,551 | A | 6/1998 | Wu et al. |
| 5,825,890 | A | 10/1998 | Elgamal et al. |
| 5,892,903 | A | 4/1999 | Klaus ................. 395/187.01 |
| 5,894,479 | A | 4/1999 | Mohammed |
| 5,946,308 | A | 8/1999 | Dobbins et al. |
| 5,958,053 | A | 9/1999 | Denker ................. 713/201 |
| 6,009,103 | A | 12/1999 | Woundy |
| 6,021,495 | A | 2/2000 | Jain et al. |
| 6,167,052 | A | 12/2000 | McNeill et al. |
| 6,167,445 | A | 12/2000 | Gai et al. |
| 6,212,191 | B1 | 4/2001 | Alexander et al. |
| 6,219,790 | B1 | 4/2001 | Lloyd et al. |
| 6,256,314 | B1 | 7/2001 | Rodrig et al. |
| 6,338,089 | B1 | 1/2002 | Quinlan |
| 6,339,830 | B1 | 1/2002 | See et al. |
| 6,363,489 | B1 | 3/2002 | Comay et al. |
| 6,393,484 | B1 | 5/2002 | Massarani |
| 6,496,502 | B1 | 12/2002 | Fite, Jr. et al. |
| 6,510,236 | B1 | 1/2003 | Crane et al. |
| 6,519,646 | B1 | 2/2003 | Gupta et al. ................. 709/229 |
| 6,553,028 | B1 | 4/2003 | Tang et al. |
| 6,615,264 | B1 | 9/2003 | Stoltz et al. |
| 6,651,168 | B1 | 11/2003 | Kao et al. |
| 6,665,278 | B2 | 12/2003 | Grayson |
| 6,728,246 | B1 | 4/2004 | Egbert et al. |

(Continued)

OTHER PUBLICATIONS

Haviland, Geoff. Designing High-Performance Campus Intranets with Multilayer Switching. Cisco Systems, Inc. 1998.*

(Continued)

*Primary Examiner*—Gilberto Barron, Jr.
*Assistant Examiner*—Virginia Ho
(74) *Attorney, Agent, or Firm*—Townsend and Townsend and Crew LLP

(57) ABSTRACT

A system and method that provides for protection of a CPU of a router, by establishing a management port on a router. Hosts which are connected to a non-management ports of the router are denied access to management functions of a CPU of the router. The system and method can utilize an application specific integrated circuit, in conjunction with a CAM-ACL, which analyzes data packets received on the ports of router, and the ASIC operates to drop data packets which are directed to the CPU of the router. This system and method operates to filter data packets which may be generated in attempts to hack in to control functions of a network device, and the operation does not require that the CPU analyze all received data packets in connection with determining access to the control functions of the router.

17 Claims, 3 Drawing Sheets

U.S. PATENT DOCUMENTS

| | | | |
|---|---|---|---|
| 6,732,270 | B1 | 5/2004 | Patzer et al. |
| 6,751,728 | B1 | 6/2004 | Gunter et al. |
| 6,771,649 | B1 | 8/2004 | Tripunitara et al. |
| 6,775,290 | B1 | 8/2004 | Merchant et al. |
| 6,789,118 | B1 | 9/2004 | Rao |
| 6,807,179 | B1 | 10/2004 | Kanuri et al. |
| 6,813,347 | B2 | 11/2004 | Baals et al. |
| 6,853,988 | B1 | 2/2005 | Dickinson et al. |
| 6,874,090 | B2 | 3/2005 | See et al. |
| 6,892,309 | B2 | 5/2005 | Richmond et al. |
| 6,907,470 | B2 | 6/2005 | Sawada et al. |
| 6,912,592 | B2 | 6/2005 | Yip |
| 6,950,628 | B1 | 9/2005 | Meier et al. |
| 6,959,336 | B2 | 10/2005 | Moreh et al. |
| 6,980,515 | B1 | 12/2005 | Schunk et al. |
| 6,981,054 | B1 | 12/2005 | Krishna |
| 7,028,098 | B2 | 4/2006 | Mate et al. |
| 7,062,566 | B2 | 6/2006 | Amara et al. |
| 7,079,537 | B1 | 7/2006 | Kanuri et al. |
| 7,088,689 | B2 | 8/2006 | Lee et al. |
| 7,092,943 | B2 | 8/2006 | Roese et al. |
| 7,093,280 | B2 | 8/2006 | Ke et al. |
| 7,113,479 | B2 | 9/2006 | Wong |
| 7,114,008 | B2 | 9/2006 | Jungck et al. |
| 7,131,141 | B1 * | 10/2006 | Blewett et al. ............ 726/12 |
| 7,134,012 | B2 | 11/2006 | Doyle et al. |
| 7,155,518 | B2 | 12/2006 | Forslow |
| 7,188,364 | B2 | 3/2007 | Volpano |
| 7,194,554 | B1 | 3/2007 | Short et al. |
| 7,234,163 | B1 | 6/2007 | Rayes et al. |
| 7,249,374 | B1 | 7/2007 | Lear et al. |
| 7,302,700 | B2 | 11/2007 | Mao et al. |
| 7,343,441 | B1 * | 3/2008 | Chrysanthakopoulos et al. ............ 710/313 |
| 7,360,086 | B1 | 4/2008 | Tsuchiya et al. |
| 7,469,298 | B2 | 12/2008 | Kitada et al. |
| 7,483,971 | B2 | 1/2009 | Sylvest et al. |
| 7,493,084 | B2 | 2/2009 | Meier et al. |
| 7,500,069 | B2 | 3/2009 | Hochmuth et al. |
| 7,516,487 | B1 | 4/2009 | Szeto et al. |
| 7,523,485 | B1 | 4/2009 | Kwan |
| 7,536,464 | B1 | 5/2009 | Dommety et al. |
| 7,567,510 | B2 | 7/2009 | Gai et al. |
| 2002/0016858 | A1 | 2/2002 | Sawada et al. |
| 2002/0055980 | A1 | 5/2002 | Goddard |
| 2002/0065938 | A1 | 5/2002 | Jungck et al. |
| 2002/0133534 | A1 | 9/2002 | Forslow |
| 2002/0146002 | A1 | 10/2002 | Sato |
| 2002/0146107 | A1 | 10/2002 | Baals et al. |
| 2003/0028808 | A1 | 2/2003 | Kameda |
| 2003/0037163 | A1 | 2/2003 | Kitada et al. |
| 2003/0043763 | A1 | 3/2003 | Grayson |
| 2003/0056001 | A1 | 3/2003 | Mate et al. |
| 2003/0056063 | A1 | 3/2003 | Hochmuth et al. |
| 2003/0065944 | A1 | 4/2003 | Mao et al. |
| 2003/0067874 | A1 | 4/2003 | See et al. |
| 2003/0105881 | A1 | 6/2003 | Symons et al. |
| 2003/0142680 | A1 | 7/2003 | Oguchi |
| 2003/0217151 | A1 | 11/2003 | Roese et al. |
| 2003/0226017 | A1 | 12/2003 | Palekar et al. |
| 2003/0236898 | A1 | 12/2003 | Hu et al. |
| 2004/0003285 | A1 | 1/2004 | Whelan et al. |
| 2004/0053601 | A1 | 3/2004 | Frank et al. |
| 2004/0160903 | A1 | 8/2004 | Gai et al. |
| 2004/0210663 | A1 * | 10/2004 | Phillips et al. ............ 709/230 |
| 2004/0213172 | A1 | 10/2004 | Myers et al. |
| 2004/0255154 | A1 | 12/2004 | Kwan et al. |
| 2005/0025125 | A1 | 2/2005 | Kwan |
| 2005/0055570 | A1 | 3/2005 | Kwan et al. |
| 2005/0091313 | A1 | 4/2005 | Zhou et al. |
| 2005/0185626 | A1 | 8/2005 | Meier et al. |
| 2005/0254474 | A1 | 11/2005 | Iyer et al. |
| 2006/0028996 | A1 | 2/2006 | Huegen et al. |
| 2006/0155853 | A1 | 7/2006 | Nesz et al. |
| 2007/0220596 | A1 | 9/2007 | Keeler et al. |
| 2009/0254973 | A1 | 10/2009 | Kwan |
| 2009/0260083 | A1 | 10/2009 | Szeto et al. |
| 2009/0265785 | A1 | 10/2009 | Kwan |
| 2009/0307773 | A1 | 12/2009 | Kwan |

OTHER PUBLICATIONS

Glenn, Michael. A Summary of DoS/DDoS Prevention, Monitoring and Mitigation Techniques in a Service Provider Environment. SANS Institute, Aug. 21, 2003.*

U.S. Appl. No. 10/850,505, filed May 20, 2004, Szeto et al.

U.S. Appl. No. 10/631,091, filed Jul. 31, 2003, Kwan.

U.S. Appl. No. 10/631,366, filed Jul. 31, 2003, Kwan.

U.S. Appl. No. 10/925,155, filed Aug. 24, 2004, Kwan.

Alcatel Internetworking, Inc., "Authenticated VLANs: Secure Network Access at Layer 2," An Alcatel White Paper, Nov. 2002, pp. 1-14.

Cisco Systems, Inc., Ch. 20, "Configuring Port-Based Traffic Control," Catalyst 3550 Multilayer Switch Software Configuration Guide, Cisco IOS Release 12.1 (13) EA1, Mar. 2003, pp. 1-14.

Cisco Systems, Inc., Ch. 27, "Configuring Network Security with ACLs," Catalyst 3550 Multilayer Switch Software Configuration Guide, Cisco IOS Release 12.1 (13) EA1, Mar. 2003, pp. 1-48.

Cisco Systems, Inc., Ch. 9, "Configuring 802.1X Port-Based Authentication," Catalyst 3550 Multilayer Switch Software Configuration Guide, Cisco IOS Release 12.1 (13) EA1, Mar. 2003, pp. 1-18.

Congdon, P. et al., "IEEE 802.1X Remote Authentication Dial in User Service (RADIUS) Usage Guidelines," The Internet Society, 2003, 30 pages, obtained from http://www.faqs.org/ftp/rfc/pdf/rfc3580.txt.pdf.

IEEE, The Institute of Electrical and Electronics Engineers, Inc., "Port-Based Network Access Control", 2001, pp. 1-134.

Microsoft, "Recommendations for IEEE 802.11 Access Points," Apr. 2, 2002, pp. 1-16, obtained from http://www.microsoft.com/whdc/device/network/802x/AccessPts/mspx.

Pfleeger, C. P., *Security in Computing*, Cover page, publication page, and pp. 426-434, Prentice Hall PTR, Upper Saddle River, NJ (1997).

Schmid et al., "An Access Control Architecture for Microcellular Wireless IPv6 Networks," Proceeding of 26th Annual IEEE Conference on Local Computer Networks, 2001, pp. 454-463.

http://www.cisco.com/en/US/tech/tk86/tk803/technologies_tech_note09186a00800a7828.shtml (PDF & web pages), entitled "Cisco—Cable Source—Verify and IP Address Security," printed Jul. 23, 2003, 25 pages in length.

http://www.sans.org/rr/threats/spoofed.php (PFD and web pages), entitled Spoofed IP Address Distributed Denial of Service Attacks: Defense-in-Depth, printed Jul. 23, 2003, 7 pages in length.

http://www.cert.org/incident_notes/IN-2000-04.html, entitled "CERT® Incident Note IN-2000-04 (Denial of Service Attacks using Nameservers)," printed Jul. 23, 2003, 3 pages in length.

http://www.anml.iu.edu/PDF/Automatic_Spoof_Detector.pdf, entitled "Automatic Spoof Detector (aka Spoofwatch)," dated Jan. 28, 2002, printed Jul. 23, 2003, 2 pages in length.

http://www.linuxgazette.com/issue63/sharma.html, entitled "IP Spoofing," printed Jul. 23, 2003, 3 pages in length.

http://www.legions.org/kv/kv7.txt, entitled "Keen Veracity Legions of the Underground Issue # [7],:" printed Jun. 24, 2003, pp. 1-41.

http://www.networkcommand.com/docs/ipspoof.txt, entitled "[ IP-spoofing Demystified ] (Trust-Relationship Exploitation)," Jun. 1996, printed May 18, 2003, pp. 1-9.

http://www.cisco.com/en/US/products/hw/switches/ps574/products_configuration_guide_chapter09186a008007ef90.html#xtocid3 (PDF & web pages), entitled "Cisco Catalyst 1900 Series Switches," printed Jul. 29, 2003, 13 pages in length.

http://www.cisco.com/en/US/products/sw/iosswrel/ps1839/products_feature_guide09186a00801543c8.html#1027177 (PDF & web pages), entitled "Cicso IOS Software Releases 12.2 T," printed Jul. 29, 2003, 26 pages in length.

http://www.cisco.com/en/US/tech/tk648/tk361/ technologies_tech_note09186a0080094adb.shtml (PDF & web pages), entitled "IP Addressing Services," printed Jul. 29, 2003, 10 pages in length.

http://www.extremenetworks.com/libraries/prodpdfs/products/ ex_ware_tech_brief.pdf (Extreme Networks PDF), entitled "Tech Brief ExtremeWare 6.2," printed Jul. 29, 2003, 8 pages in length.

http://www.extremenetworks.com/libraries/prodpdfs/products/ UnifiedWireless.asp (Extreme Networks PDF & web pages), entitled: Unified Access Architecture for Wired and Wireless Networks, printed Jul. 29, 2003, 10 pages in length.

U.S. Appl. No. 12/392,422, filed Feb. 25, 2009, Szeto et al.

U.S. Appl. No. 12/392,398, filed Feb. 25, 2009, Philip Kwan.

Pfleeger, "Security in Computing," 2nd edition, 1996, p. 426-434, Prentice Hall PTR, NJ.

Non-Final Office Action for U.S. Appl. No. 10/458,628, Mailed Dec. 8, 2006, 14 pages.

Final Office Action for U.S. Appl. No. 10/458,628, Mailed Jun. 1, 2007, 19 pages.

Non-Final Office Action for U.S. Appl. No. 10/458,628, Mailed Nov. 30, 2007, 19 pages.

Non-Final Office Action for U.S. Appl. No. 10/458,628, Mailed Aug. 15, 2008, 20 pages.

Final Office Action for U.S. Appl. No. 10/458,628, Mailed Feb. 26, 2009, 26 pages.

Non Final Office Action for U.S. Appl. No. 10/631,091, Mailed Jan. 12, 2007, 9 pages.

Final Office Action for U.S. Appl. No. 10/631,091, Mailed May 28, 2008, 13 pages.

Non Final Office Action for U.S. Appl. No. 10/631,091, Mailed Oct. 28, 2008, 15 pages.

Notice of Allowance for U.S. Appl. No. 10/631,091 Mailed Apr. 24, 2009, 9 pages.

Non-Final Office Action for U.S. Appl. No. 10/631,366. Mailed Feb. 2, 2007, 14 pages.

Final Office Action for U.S. Appl. No. 10/631,366, Mailed Oct. 10, 2007, 17 pages.

Non-Final Office Action for U.S. Appl. No. 10/631,366, Mailed Jul. 17, 2008, 12 pages.

Notice of Allowance for U.S. Appl. No. 10/631,366, Mailed Jan. 13, 2009, 10 pages.

Non-Final Office Action for U.S. Appl. No. 10/631,898, Mailed Jul. 24, 2007, 11 pages.

Non-Final Office Action for U.S. Appl. No. 10/631,898, Mailed Feb. 20, 2008, 13 pages.

Non-Final Office Action for U.S. Appl. No. 10/631,898, Mailed Sep. 4, 2008, 14 pages.

Non-Final Office Action for U.S. Appl. No. 10/631,898, Mailed Apr. 28, 2009, 17 pages.

Non-Final Office Action for U.S. Appl. No. 10/654,417, Mailed Dec. 15, 2006, 11 pages.

Final Office Action for U.S. Appl. No. 10/654,417, Mailed Jun. 18, 2007, 15 pages.

Non-Final Office Action for U.S. Appl. No. 10/654,417, Mailed Dec. 31, 2007, 19 pages.

Non-Final Office Action for U.S. Appl. No. 10/654,417, Mailed Jul. 29, 2008, 19 pages.

Final Office Action for U.S. Appl. No. 10/654,417, Mailed Feb. 27, 2009, 17 pages.

Non Final Office Action for U.S. Appl. No. 10/850,505, Mailed Dec. 7, 2007, 14 pages.

Final Office Action for U.S. Appl. No. 10/850,505 Mailed Jun. 12, 2008, 12 pages.

Notice of Allowance for U.S. Appl. No. 10/850,505, Mailed Sep. 4, 2008, 6 pages.

Notice of Allowance for U.S. Appl. No. 10/850,505, Mailed Jan. 14, 2009, 10 pages.

Wright, "Using Policies for Effective Network Management," International Journal of Network Management, pp. 118-125, John Wiley & Sons, Ltd. 1999.

Non-Final Office Action for U.S. Appl. No. 10/458,628, Mailed on Oct. 8, 2009, 23 pages.

Final Office Action for U.S. Appl. No. 10/631,898, Mailed on Dec. 18, 2009, 17 pages.

Non-Final Office Action for U.S. Appl. No. 10/654,417, Mailed on Sep. 4, 2009, 20 pages.

Office Action for U.S. Appl. No. 10/925,155, Mailed on Apr. 14, 2009.

Office Action for U.S. Appl. No. 10/925,155, Mailed on Mar. 20, 2008.

Office Action for U.S. Appl. No. 10/925,155, Mailed on Oct. 27, 2008.

Office Action for U.S. Appl. No. 10/925,155, Mailed on Jan. 11, 2010.

Welcher, "Switching MultiLayer Switching," Chesapeake Netcraftsmen, Copyright 1999, pp. 1-7, available at URL: http//www.netcraftsmen.net/welcher/papers/switchhmls.html.

Final Office Action for U.S. Appl. No. 10/458,628, mailed on Mar. 24, 2010, 29 pages. (Copy available via PAIR).

Final Office Action for U.S. Appl. No. 10/654,417, mailed on Mar. 24, 2010, 28 pages. (Copy available via PAIR).

Notice of Allowance for U.S. Appl. No. 10/654,417, mailed on Apr. 22, 2010, 14 pages. (Copy available via PAIR).

* cited by examiner

SYSTEM AND METHOD FOR PROTECTING CPU AGAINST REMOTE ACCESS ATTACKS

FIELD OF THE INVENTION

The present invention relates to a method of providing for protection against remote attacks attempting to access management functions of network devices such as switches and routers.

BACKGROUND

FIG. 1 shows a system 10 of the prior art. A router 11 operates to provide layer 3 routing of data packets between different hosts of the system. As generally discussed herein layer 3 is a reference to the network layer which determines how to transmit messages between connected network segments. Different aspects of different operations of such networks are discussed generally in the International Standards Organization, standard ISO/IEC 7498, which defines a 7-layer model for describing interconnected systems. It is referred to as the Open Systems Interconnection (OSI) model, and is incorporated herein by reference in its entirety.

The router 11 operates to route data packets received on a port of the router to other ports of the router based on a destination source IP address contained in the data packet. Typically a router will contain a large number of ports to which different data link layer (layer 2 of the OSI model) subnets are connected. In FIG. 1 six ports 12, 14, 16, 18, 20 and 22 are shown, but in many embodiments the router would include additional ports. For example, a typical router could include 24 or 36 ports.

The router 11 includes a CPU 24 which operates to control operations of the router. As is known in the art a CPU 24 operates to execute software program instructions which are loaded into the CPU 24. These software instructions can be stored in a memory 28 and the memory 28 can be utilized by the CPU 24 to access stored information, and instructions. The router 11 also includes content addressable memory (CAM) 26. The CAM includes fields which store data forming an access control list ACL. An application specific integrated circuit (ASIC) 27 is provided, and the ASIC utilizes the CAM with an ACL. The functionality of the ASIC 27 is determined by its hard wiring, and the content of the CAM and the ACL data fields (as opposed to a CPU which requires the loading of software). Thus the ASIC 27 can provide for the switching of the of data packets, or other possible functions at a very high speed relative to the operation of the CPU 24, and the CPU processing power can be used for other operational details of the router.

One aspect of the operation of the router 11 is that it allows for network managers to access control features of the router. Typically, the CPU 24 will be programmed to allow a network manager to change operations of the router. For example, a network manager might modify routing tables of the router, block certain ports from traffic from hosts having different IP addresses, set up new subnets or change subnets.

In order to gain access to, and send instructions to the CPU 24 for the management of the router 11, typically one of a number of different known management communication protocols are used; these protocols include Telnet, SSH, Web management, SNMP, and TFTP etc.

In general operation prior systems operated such that each port of the router can be used to access the CPU management functions of the router. This means that the gateway IP address associated with each port of the router can function as a management address, in that host generating data packets directed to any of the gateway addresses of the ports of router can access management of the router. As a result security procedures have to be provided which allow for filtering and controlling access to the management function of the router through each port and corresponding gateway address of the router.

FIG. 1 shows layer 2 subnets 30, 32, 34, 36, 38 and 40 connected to ports 12, 14, 16, 18, 20 and 22 of the router 11. The layer 2 subnets would typically include a number of layer 2 switches networked together, and hosts, such as personal computers or other devices would be connected to the switches. A host having proper authorization such as proper passwords, or having been previously identified by their source IP address, and generating data packets in accordance with the management communication protocol utilized by the system would be able to gain access to the management functions of the CPU 24 of the router 11 through the any of the ports 12-22 of the router 11. The CPU 24 is responsible for receiving the data packets from hosts of the layer 2 subnet that are directed to obtaining access to the management functions of the CPU 24. If the CPU 24 determines that the host attempting to obtain access to the management functions is not authorized for such access, for example, the host could be a hacker attempting to attack the router 11, then the CPU 24 will drop the data packets from the attacking host, and additional protective measures could also be taken.

In some cases, however, an attacking host, or possibly multiple attacking hosts on different layer 2 subnets connected to different ports of the router 11 may generate a large amount of traffic directed at the CPU 24 management functions. In some cases, where the volume of traffic is sufficiently large, the CPU 24 can become overwhelmed and its ability to effectively filter and authenticate attempts to gain access to the management functions of the router 11 can be significantly reduced and render the router 11 vulnerable to attack. Thus, what is needed is a way to provide enhanced protection against attacks on the router CPU 24 and its management functions.

DETAILED DESCRIPTION

One of the shortcomings of some prior systems is that traffic on each of the ports of a router must be analyzed and filtered in connection with allowing a host on the network to have access to management functions of the router. One aspect of an embodiment of the system herein, is that it allows network administrator to define a single port and its corresponding gateway address as being a management port, and only communications received through the management port will be granted access to the management functions of the router. Thus, in one embodiment only those hosts which are connected to a subnet which is connected with the management port will be able to obtain access to the management functions of the router. For all ports of the router, other than the port which is defined to be the management port, a set of rules can be applied to data traffic on the ports, whereby any data packets received on any of the non-management ports are denied access to the management control functions of the router. Aspects of this operation are illustrated in connection with the discussion below.

Figure 2:
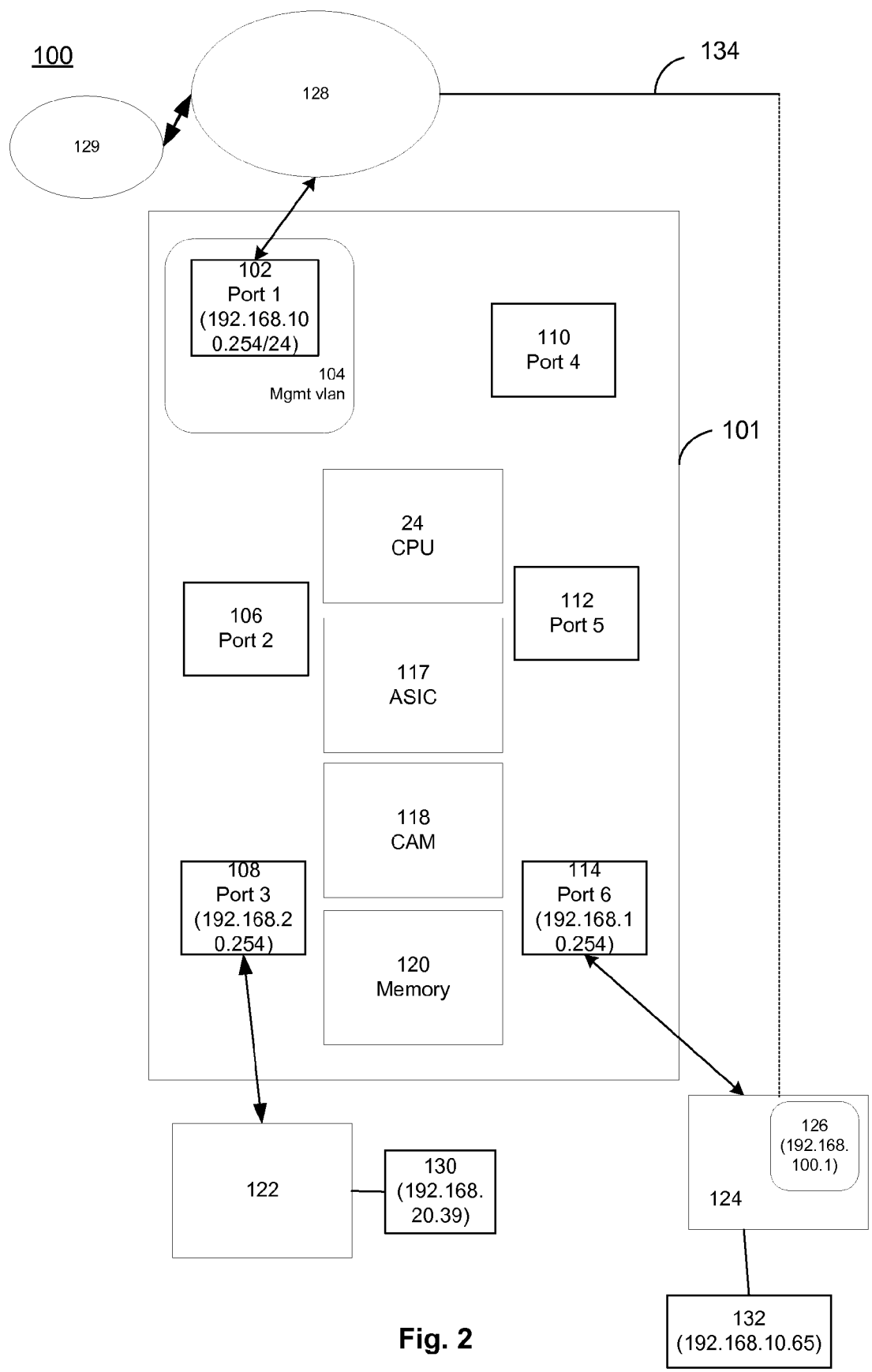
FIG. 2 shows an embodiment of a network device of the present invention.

FIG. 2 shows a system 100 of an embodiment of the present invention. The router 101 operates to provide layer 3 routing of data packets between different hosts on the system. For example, the router 101 can route data packets received on a port of the router 101 to other ports of the router based on a destination IP address contained in a received data packet. Typically a router will contain a large number of ports to which different level 2 subnets are connected. In FIG. 2 six ports 102, 106, 108, 110, 112 and 114 are shown, but in many embodiments the router would include additional ports.

The router 101 includes a CPU 116 which operates to control operations of the router. As is known in the art, a CPU operates to execute software program instructions which are loaded into the CPU 116. These software instructions can be stored in a memory 120, and the memory 120 can be utilized by the CPU 116 to access stored information and instructions. The router 101 also includes content addressable memory. The CAM includes fields which form an access control list (ACL). An application specific integrated circuit 117 (ASIC) is provided, and the ASIC 117 utilizes the CAM with an ACL. The functionality of the ASIC 117 is determined by its hard wiring, and the content of the CAM and the ACL data fields (as opposed to a CPU which requires the loading of software). Thus the ASIC 117 can provide for the switching of the of data packets, or other possible functions at a very high speed relative to the operation of the CPU 116, and the CPU processing power can be used for other operational details of the router. Further, as described in detail below, an embodiment herein provides for the ASIC 117 and the CAM-ACL 118 operating to protect the CPU 116 from remote access to the management functions through ports other than a designated management port.

As discussed above, one aspect of the operation of the router 101 is that it allows for network managers to access control features of the router. Typically, the CPU 116 will be programmed to allow a network manager to change operations of the router. For example, a network manager might modify routing tables of the router, block certain ports from traffic from hosts having certain IP addresses, set up new subnets or change subnets. As discussed above, in order to gain access to, and send instructions to a CPU for the management of the router 101, typically one of a number of different management communication protocols are used. These protocols can include Telnet, SSH, Web management, SNMP, and TFTP etc.

To illustrate the operation of an embodiment of the invention, it is helpful to consider some aspects of the general operation of the router 101. FIG. 2 shows a layer 2 subnet 124 connected to a port 114 of the router 101. A second layer 2 subnet 122 is connected to port 108 of the router 101. As is known in the art, each port of the router would have a gateway IP address. For example port 114 could have the gateway IP address 192.168.10.254. Each host connected to the subnet 124 would be assigned an IP address indicating that that it corresponds to the subnet 124 connected to the gateway of port 114. For example, consider a host 132 connected to a layer 2 switch of the subnet 124, it could be assigned an IP address such as 192.168.10.65. The first three octets 192.168.10 are the same as the first three octets of the corresponding gateway IP address for port 114.

The port 108 would have a different gateway address. For example it could be 198.168.20.254. A host 130 connected to the layer 2 subnet 122 could have an assigned source IP address of, say for example, 198.168.20.39. Again it is noted that the first three octets of the source IP address for the host 130 correspond to the gateway address for the port 108 to which its subnet 122 is connected. If the host 132 wanted to communicate with the host 130 it would generate a data packet indicating that the desired destination was 198.168.20.39. These data packets would be received by a switch in the subnet 124, which would recognize that the destination host was not in the subnet 124 and the data packet would be routed to the gateway of port 114, and the router 101 would recognize the destination IF address in the data packet and route the data packet to port 108 and the subnet 122 where it would be directed to the host 130.

In an embodiment of the present invention a management virtual local area network MVLAN 104 is defined. A virtual local area network is a widely known arrangement whereby a number of physical ports of network devices, such as switches and routers, are logically associated with each other, and thus form a virtual local area network. In order to provide for enhanced security the MVLAN 104 can be defined to include only a single port 102 of the router 101. The MVLAN 104 is further defined to include ports of the layer 2 subnet 128. Thus, the subnet 128, can become a management subnet. The router port 102 of the router 101 has a gateway address; for example it could be 198.168.100.254/24. Typically the subnet 128 connected to MVLAN port 102 would be part of network operating center for a service provider which operates and manages the system 100. To gain access to the management of the router 101 a host, for example 129, connected to the subnet 128 would generate data packet directed to the gateway address 192.168.100.254/24 using a management protocol which is utilized by the CPU 116, and based on such data packets the host 129 would then gain access to management interfaces provided by the CPU 116 to control the router 101. Additionally, in one embodiment switches in the layer 2 subnets would have a plane, or port, which is defined to be included in the MVLAN 104, and this plane would be assigned an IP address corresponding to the IP address of the gateway address for the port 102 (192.168.100.254/24). FIG. 2 shows an example of this in subnet 124, as having a MVLAN component 126 which could be assigned, for example IP address 192.168.100.1. For purposes of simplicity of discussion layer 2 subnet 124 could be a single layer 2 switch, but as of skill in the art will appreciate, the layer 2 subnet could be configured to include multiple network devices such as layer 2 switches.

In one embodiment the ASIC 117 utilizes the CAM-ACL 118 and operates to analyze each data packet received on any of the ports of the router 101. If any of the ports which are not defined as part of the MVLAN 104 (e.g., ports 106, 108, 110, 112 and 114) receives a data packet which has a destination IP address which corresponds to the gateway IP address of the port 102 included in the MVLAN 104, in this case 192.168.100.254/24, then the ASIC 117 and CAM-ACL 118 will determine if the data packet is utilizing one of the management IP protocols (e.g. Telnet, SSH, Web management, SNMP, or TFTP etc.). The group of ports which are not part of the MVLAN are non-management ports. Depending on the actual implementation, it would frequently be the case that all of ports of the router with the exception of a single port, will be non-management ports. Depending on the number of ports in the router, the group of ports which are non-management ports, could be a single port, or in excess of 60 ports.

Where the ASIC 117 determines that a data packet received on a non-MVLAN port of the router 101 is in a management IP protocol, and the destination IP address is one which corresponds to the gateway address for the port 102, then ASIC 117 operates to filter the data packet. In general operation this filtering of such a data packet would consist of dropping the data packet, so that it would not be sent to the destination indicated as the destination IP address. This filtering could also include storing such data packets in a buffer, or other storage area, or otherwise separating or segregating these types of data packets, where they could be subsequently analyzed in connection with trying to identify the source of a potential attempted attack, where a hacker tries to gain access to management control functions of a router. This operation of the ASIC 117 and CAM-ACL 118 prevents any host connected to a layer 2 subnet which is connected to a port of the router 101, other than port 102, from gaining access to the management functions provided by the CPU 116 of the router 101. Because the ASIC 117 and CAM-ACL 118, does this filtering operation, the CPU 116 of the router 101 does not need to divert any processing power to analyzing data packets which are received on ports of the router 101 which are not included in the MVLAN 104, and to then determine whether the host sending the data packet is authorized to access the management functions of the CPU 116.

As shown by the above discussion in order for a host to gain access to the management control functions of the CPU 116, the host must generate and transmit management data packets, where such packets are ones which are directed to an IP address which corresponds to the gateway IP address for the management port, and where such packets are originate from a management VLAN.

Figure 1:
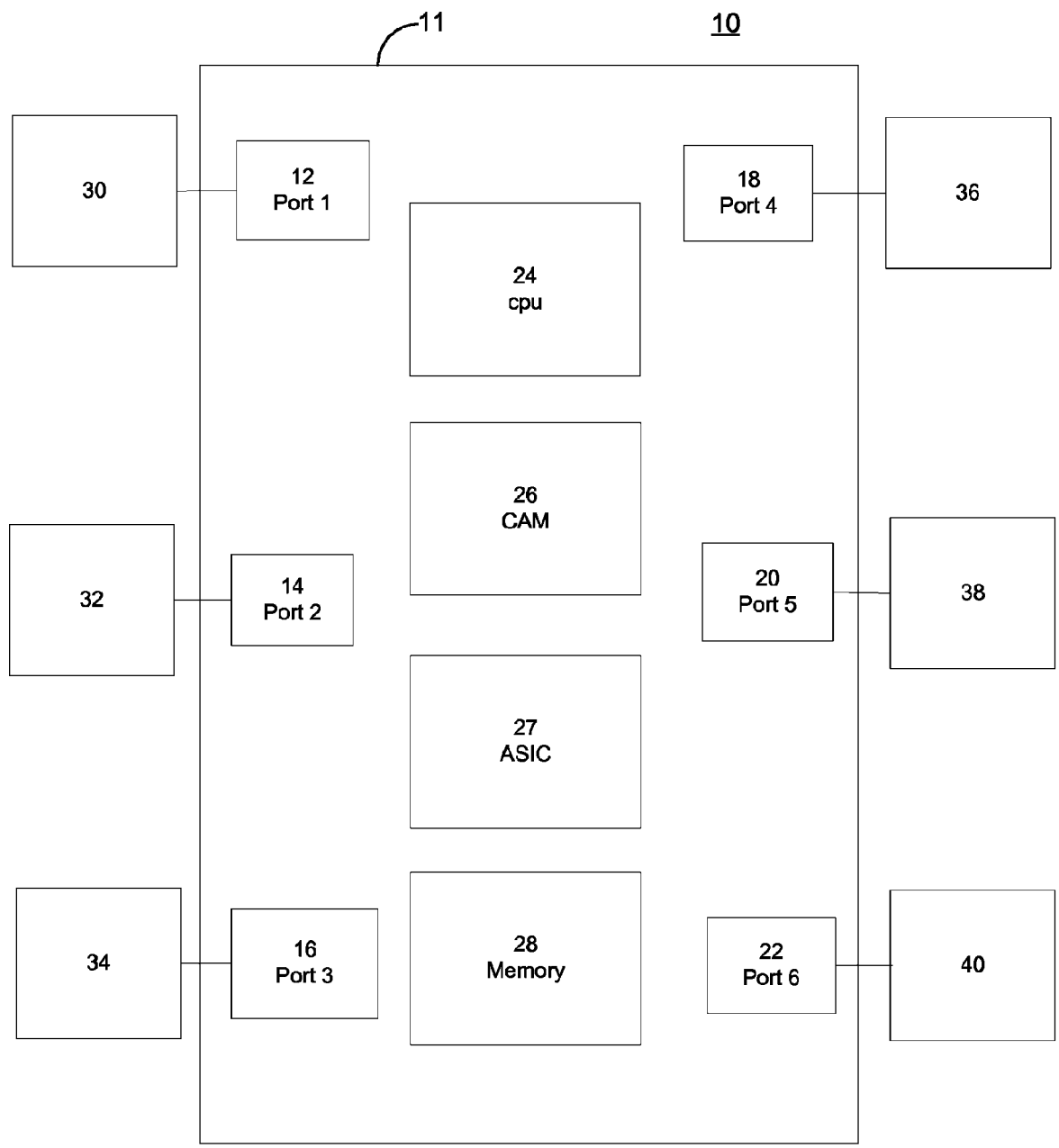
FIG. 1 shows an overview of a system of the prior art.

This operation of the router 101 offers significant advantages over the prior system of FIG. 1, in that the CAM-ACL 118, which is utilized by the ASIC 117, is easily configured to provide for efficient filtering which drops data packets attempting to access management control function of the CPU 116. Further, improved security is provided in that only those hosts which are included in the MVLAN will have access to the management control functions, and the CPU 116 is not responsible for filtering all data packets directed to the management control functions of the CPU 116. It should also be noted that although FIG. 2 shows a single CAM-ACL 118 and ASIC 117, multiple CAM-ACLs and ASICs could be provided, where each CAM-ACL and ASIC could monitor data packets on the different ports. Also, although not shown in FIG. 2 each port would in most systems be connected to corresponding subnets, in manner similar to that shown in FIG. 1.

An example of the operation of an embodiment herein helps to illustrate an embodiment of a method of the system. Consider a situation where the host 132 tries to send a data packet to the gateway address of the MVLAN. In the embodiment shown in FIG. 2 access to the control functions of the CPU is only provided through an IP address which corresponds to the gateway address (192.168.100.254/24) of port 102. Thus in order for host 132 to attempt to gain access the control functions of the CPU 116, it would have to generate data packets having a destination IP address which corresponds to this gateway address. Further, this data packet would need to utilize one of the management protocols in order to gain access to the management functions of the router 101. This data packet would be transmitted from the host 132 through the subnet/switch 124 to the port 114. The CAM-ACL 118 and ASIC 117 would then determine that the data packet was directed to the gateway address for the MVLAN, and would determine that the data packet utilized one of the management protocols. In response to determining that the data packet was directed to the gateway address of the MVLAN and that the data packet was in one of the management information protocols, the ASIC 117 would drop the data packet. Thus, the operation of the ASIC and CAM-ACL prevents the CPU from having to divert the processing power to protecting against potential hacker attacks coming from any of the non-MVLAN ports. The end result of this operation is that all devices connected to any port of the router 101 other than the defined management port 102, would be denied access to the management functions of the CPU 116 of the router 101.

Further, the operation provides if the host 132 was to try and gain access to the management control of the subnet/switch 124. The ASIC 117 would again prevent access. Specifically, if a host, such as the host 132, were to direct a management control data packet to the IP address of 126, which has an IP corresponding to the MVLAN gateway address, for example it might be 192.168.100.1, then the host 132 would generate a data packet having a destination address of 192.168.100.1. The subnet/switch 124 would recognize that this was not an IP address corresponding to the gateway 192.168.10.254, and would route the data packet to the port 114. At port 114 the ASIC 117 and CAM-ACL 118 would recognize that the data packet was directed to an IP address corresponding to the MVLAN and that it was utilizing one of the management protocols and would drop the data packet. Thus, the host 132 would be denied access to the management function of the subnet/switch 124.

In contrast where a host, such as host 129, is connected to the MVLAN subnet 128 and it generates a data packet with is directed to 126, this data packet will be received on port 102. The ASIC 117 and CAM-ACL 118 apply different rules to data packets received on the MVLAN 104 port 102. Assuming that management protocol data packet is received from a host on the subnet 128, then the data packet will reach the CPU 116 and can gain access to management function of the router 101. The CPU 116 could of course provide for additional levels protection for management controls. Assuming that the CPU grants management functions to the host on the subnet 128 and the host directs functional instruction to the plane 126, then the management function of the CPU 116 will generate data packets with the instructions to plane 126 of IP address 198.168.100.1 and these data packets will be transmitted through the port 114 to 126, where the instructions will be implemented by the switch 124.

The CPU 116 also operates to provide for prioritization of data packet routed through the router 101. For example, assume that the host 129 access the management functions of the CPU 116. The router operates to prioritize the data packets coming from the host 129 and give these management control data packets highest priority relative to other data packets being routed through the router 101. Line 134 represents a situation where a host on the control subnet 128 has accessed control functions of the CPU 116 and is sending management control instructions to the switch 124. These management control instructions would be routed as directly as possible with the highest priority through the router 101.

This operation of prioritizing data packets with management control instructions could be implemented in a number of different ways. One embodiment could provide that when policies for CPU Protection against remote access are configured through the CPU 116, and the protection rules are stored in the CAM, and/or a Parameter RAM (PRAM) memory could also be utilized, prioritization rules could also be stored. During actual operation the ASIC will look up the source IP and destination IP addresses (this could be done by referring to information in the CAM ACL for example) where these IP addresses are identified as part of the management VLAN, then the ASIC operates to route the corresponding management control instructions with the highest priority.

Figure 3:
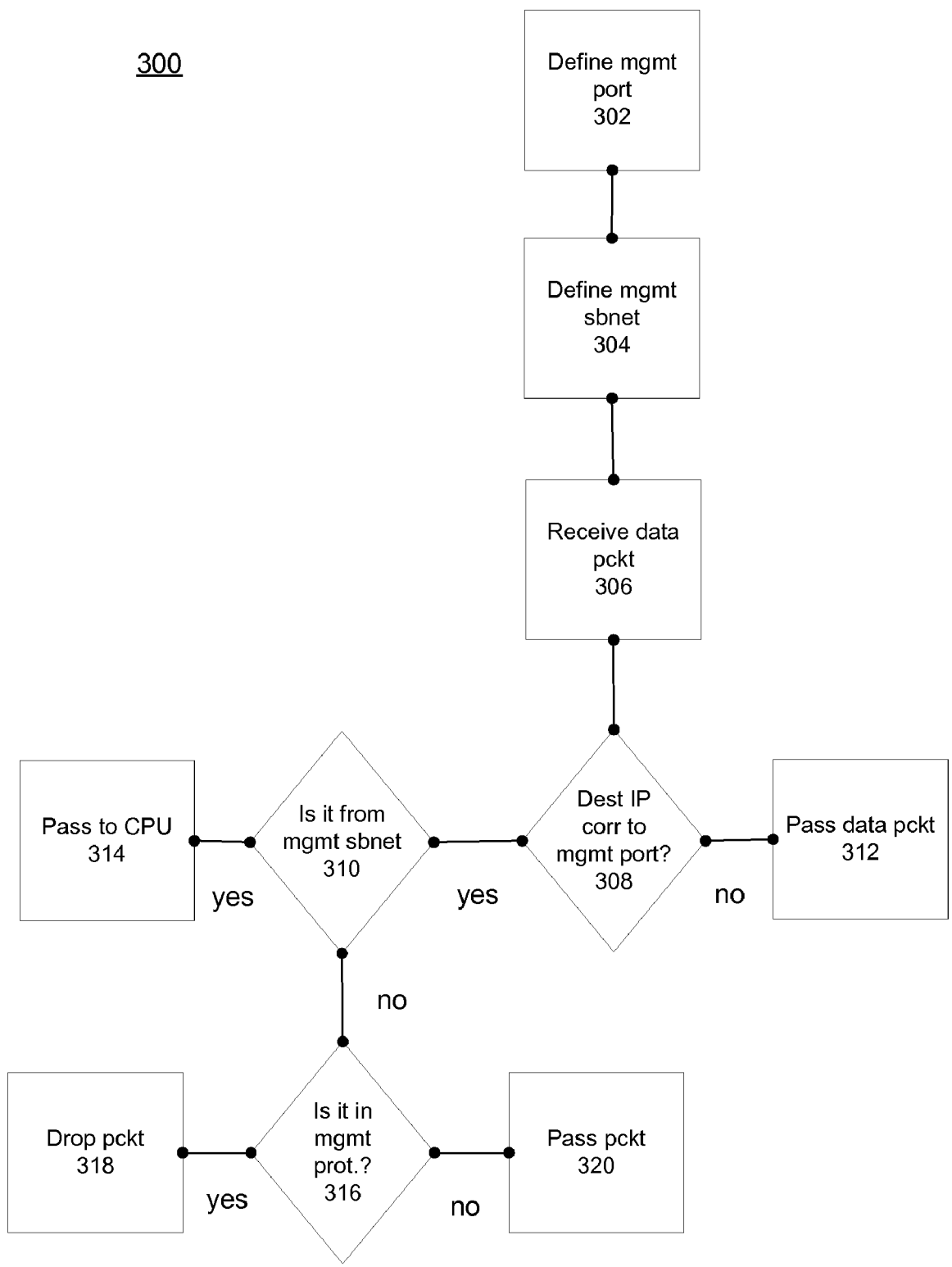
FIG. 3 shows a method of an embodiment of the present invention.

FIG. 3 shows a method 300 of an embodiment of the invention. At 302 a management port is defined. This can include creating a management virtual local area network as described above. A management subnet is defined at 304. The management subnet can be part of the management VLAN as described above. Additionally, management VLAN planes can be defined in layer 2 switches of other subnets of the system, as describe above. In operation of the system, data packets are received on ports of the router at 306. The received data packets are then analyzed 308 to determine if they include a destination IP address which correspond to the management address. If the received data packet does not have a destination IP address which corresponds to the management address then the data packet will be passed 312 according to the destination IP address in the data packet. If the received data packet has a destination IP address which corresponds to the management address, then the received data packet is analyzed 310 to determine if it was received from the management subnet. If it was received from the management subnet then the data packet can be passed 314 to the CPU. If the data packet was not received from the management subnet, then the data packet is analyzed 316 to determine if it utilizes a management protocol. If it is in a management protocol, then the data packet is dropped 318. If the data packet is not in a management data protocol, then the data packet is passed 320.

Some aspects related to implementation and additional embodiments herein are shown in more detail below. In connection with configuring a layer 2 switch of a subnet for remote access as part of the MVLAN, a user can assign specific ports of a layer 2 switch of the management subnet as being part of the MVLAN. Thus, instead of defining a host IP address and protocol, and rules to be applied by a CPU, certain ports can be defined to have access to the CPU of the router. The below syntax shows code which defines a VLAN to include ports 1-5 on a third blade of layer 2 switch, and shows the IP address and subnet mask for the management access gateway.

vlan 3 by port
untagged the 3/1 to 3/5
!
!
ip address 10.10.11.1 255.255.255.0
telnet access 10 vlan 3
!
access-list 10 deny 10.10.11.0 0.0.0.255.

In addition to configuring the layer 2 switches of the system, the layer 3 router can also be configured by the user in connection with controlling remote access to the CPU. The IP address specified in the router-interface will become the management IP address of the MVLAN. The below syntax shows an example of code which could be used in connection with configuring the router.

| | |
|---|---|
| vlan 3 by port | This text defines the MVLAN |
| untagged ethe 3/1 to 3/5 | and management port and the |
| router-interface ve 3 | IP address for the |
| ! | management port and the |
| interface ve 3 | subnet mask. |
| ip address 10.10.11.1 255.255.255.0 | |
| access-list 10 permit host 10.10.11.254 | This text identifies different |
| access-list 10 permit host 192.168.2.254 | host as having access, and |
| access-list 10 permit host 192.168.12.254 | denies any other hosts from |
| access-list 10 permit host 192.64.22.254 | having access |
| access-list 10 deny any | |
| telnet access-group 10 vlan 3 | This text defines and refers |
| ssh access-group 10 vlan 3 | to rules for different |
| web access-group 10 vlan 3 | management protocols. |
| snmp-server community | |
| private rw 10 vlan 3 | |

The table below shows a table from a CAM with rules which are applied to a port of the router which is defined as management port. The table shows that if any source IP address for received data packet is something other than one of the source IP address which is identified as permitted for management access, then if the datapacket is in the telnet protocol "23" and the data packet has a destination IP address corresponding to the management port then the data packet will be discarded. Similar implementation could be provided for other management protocols.

| | | | | | | | | |
|---|---|---|---|---|---|---|---|---|
| | | | | Router(config)#show cam 14 3/1 | | | | |
| S1 | Index | Src IP_Addr | SPort | Dest IP_Addr | DPort | Prot | Age | Out Port |
| 3 | 40960 | 192.64.22.254/32 | Any | 10.10.11.1/24 | 23 | TCP | dis | Use L2/L3 |
| 3 | 40962 | 192.168.12.254/32 | Any | 10.10.11.1/24 | 23 | TCP | dis | Use L2/L3 |
| 3 | 40964 | 192.168.2.254/32 | Any | 10.10.11.1/24 | 23 | TCP | dis | Use L2/L3 |
| 3 | 40966 | 10.10.11.254/32 | Any | 10.10.11.1/24 | 23 | TCP | dis | Use L2/L3 |
| 3 | 40968 | Any | Any | 10.10.11.1/24 | 23 | TCP | dis | Discard |

The below text shows code syntax of an embodiment of the invention where management protocol data packets directed to the IP address of the management port are disabled for hosts connected non-management ports of the router. Specifically, a user can control management access to interfaces by disabling the management IP through the CAM, and although this feature allow users to choose which interface IP is not management IP, it does not affect any L3 routing for that interface.

| | |
|---|---|
| global-protocol-vlan | This text relates to defining the |
| ! | VLAN and defining the |
| ! | management port interface 3/10 |
| vlan 1 name DEFAULT-VLAN by port | and assigning the management |
| ! | IP address 10.10.10.1. |
| ! | |
| ! | |

-continued

```
router ospf
  area 0
!
interface ethernet 3/10
  ip address 10.10.10.1 255.255.255.0
  ip ospf area 0
interface ethernet 3/11                This text shows that the ports
  ip address 11.11.11.1 255.255.255.0  3/11, 3/12, and 3/13 are disabled
  ip ospf area 0                       for management access.
  management-ip-disable
!
interface ethernet 3/12
  ip address 12.12.12.1 255.255.255.0
  ip ospf area 0
  management-ip-disable
!
interface ethernet 3/13
  ip address 13.13.13.1 255.255.255.0
  ip ospf area 0
  management-ip-disable
```

The table below shows a table from the CAM with rules which are applied to a port of the router which corresponds to the interface 3/11 which is shown above as having the management—ip disable. The table shows that regardless of the source ip address of a data packet, if the destination address corresponds to the management port, and the data packet is one of the management protocols, then the data packet will be discarded.

| Router(config)#show cam 14 3/11 | | | | | | | | |
|---|---|---|---|---|---|---|---|---|
| S1 | Index | Src IP_Addr | SPort | Dest IP_Addr | DPort | Prot | Age | Out Port |
| 3 | 40960 | Any | Any | 11.11.11.1/24 | 23 | TCP | dis | Discard |
| 3 | 40962 | Any | Any | 11.11.11.1/24 | 80 | TCP | dis | Discard |
| 3 | 40964 | Any | Any | 11.11.11.1/24 | 1812 | TCP | dis | Discard |
| 3 | 40966 | Any | Any | 11.11.11.1/24 | 49 | TCP | dis | Discard |
| 3 | 40968 | Any | Any | 11.11.11.1/24 | 22 | TCP | dis | Discard |
| 3 | 40970 | Any | Any | 12.12.12.1/24 | 23 | TCP | dis | Discard |
| 3 | 40972 | Any | Any | 12.12.12.1/24 | 80 | TCP | dis | Discard |
| 3 | 40974 | Any | Any | 12.12.12.1/24 | 1812 | TCP | dis | Discard |
| 3 | 40976 | Any | Any | 12.12.12.1/24 | 49 | TCP | dis | Discard |
| 3 | 40978 | Any | Any | 12.12.12.1/24 | 22 | TCP | dis | Discard |
| 3 | 43520 | Any | Any | 11.11.11.1/24 | 161 | UDP | dis | Discard |
| 3 | 43522 | Any | Any | 11.11.11.1/24 | 69 | UDP | dis | Discard |
| 3 | 43524 | Any | Any | 11.11.11.1/24 | 49 | UDP | dis | Discard |
| 3 | 43526 | Any | Any | 12.12.12.1/24 | 161 | UDP | dis | Discard |
| 3 | 43528 | Any | Any | 12.12.12.1/24 | 69 | UDP | dis | Discard |
| 3 | 43530 | Any | Any | 12.12.12.1/24 | 49 | UDP | dis | Discard |

It should be noted that the above syntax related to potential software code of different embodiments should be viewed as illustrative, and one of skill in the art would recognize that specific implementations of the invention herein could be implemented in different ways. Thus, while various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method comprising:
   identifying, by a network device, a first port of the network device as a management port, the first port having a gateway address;
   identifying, by the network device, a second port of the network device as a non-management port; and
   filtering, by the network device, a data packet received on the second port if a destination IP address of the data packet corresponds to the gateway address of the first port and if the data packet utilizes a management protocol.

2. The method of claim 1, wherein the filtering comprises dropping the data packet.

3. The method of claim 1, further comprising passing the data packet received on the second port if the data packet originated from a virtual local area network that includes the first port.

4. The method of claim 3, wherein another network device is connected to the second port, wherein a port of the another network device is defined to be part of the virtual local area network and is assigned a source IP address corresponding to the gateway address of the first port, and wherein management data packets for managing the another network device are sent to the source IP address.

5. The method of claim 4, wherein the management data packets have higher priority than other data packets routed through the network device.

6. The method of claim 1, wherein the network device includes an application specific integrated circuit operable to perform the filtering.

7. The method of claim 6, wherein the application specific integrated circuit is configured to determine if the destination IP address for the data packet received on the second port corresponds to the gateway address of the first port.

8. A network device comprising:
   a first port defined as a management port;
   a second port defined as a non-management port;
   an application specific integrated circuit operable to filter a data packet received on the second port if a destination IP address of the data packet corresponds to a gateway address of the first port and if the data packet utilizes a management protocol.

9. The network device of claim 8 wherein the filtering comprises dropping the data packet.

10. The network device of claim 8, wherein the application specific integrated circuit is further operable to pass the data packet received on the second port if the data packet originated from a virtual local area network that includes the first port.

11. A network device comprising:
a plurality of ports including a management port; and
a control component configured to:
   determine if a destination IP address included in a received data packet corresponds to a gateway IP address of the management port;
   if the destination IP address corresponds to the gateway IP address of the management port, determine if the data packet originated from a management virtual local area network (VLAN), wherein the management VLAN includes the management port;
   if the data packet did not originate from the management VLAN, determine if the data packet uses a management protocol; and
   if the data packet uses a management protocol, drop the packet.

12. The network device of claim 11 wherein if the destination IP address does not correspond to the gateway IP address of the management port, the control component is configured to pass the data packet.

13. The network device of claim 11 wherein if the data packet did originate from the management VLAN, the control component is configured to pass the data packet.

14. The network device of claim 11 wherein if the data packet does not use a management protocol, the control component is configured to pass the data packet.

15. The network device of claim 11 wherein the network device is a router.

16. The method of claim 1 wherein filtering the data packet received on the second port comprises storing the data packet in a memory area separate from other types of received data packets.

17. The network device of claim 8 wherein filtering the data packet received on the second port comprises storing the data packet in a memory area separate from other types of received data packets.

* * * * *

(12) EX PARTE REEXAMINATION CERTIFICATE (10660th)
United States Patent
Szeto et al.

(10) Number: US 7,774,833 C1
(45) Certificate Issued: Jul. 15, 2015

(54) SYSTEM AND METHOD FOR PROTECTING CPU AGAINST REMOTE ACCESS ATTACKS

(75) Inventors: Ronald W. Szeto, Pleasanton, CA (US); Philip Kwan, San Jose, CA (US); Raymond Wai-Kit Kwong, Los Altos, CA (US)

(73) Assignee: BROCADE COMMUNICATIONS SYSTEMS, INC., San Jose, CA (US)

Reexamination Request:
No. 90/011,769, Jun. 27, 2011

Reexamination Certificate for:
Patent No.: 7,774,833
Issued: Aug. 10, 2010
Appl. No.: 10/668,455
Filed: Sep. 23, 2003

(51) Int. Cl.
*H04L 29/06* (2006.01)
*G06F 21/00* (2013.01)

(52) U.S. Cl.
CPC .................................. *H04L 63/0236* (2013.01)

(58) Field of Classification Search
None
See application file for complete search history.

(56) References Cited

To view the complete listing of prior art documents cited during the proceeding for Reexamination Control Number 90/011,769, please refer to the USPTO's public Patent Application Information Retrieval (PAIR) system under the Display References tab.

*Primary Examiner* — Joshua Campbell

(57) ABSTRACT

A system and method that provides for protection of a CPU of a router, by establishing a management port on a router. Hosts which are connected to a non-management ports of the router are denied access to management functions of a CPU of the router. The system and method can utilize an application specific integrated circuit, in conjunction with a CAM-ACL, which analyzes data packets received on the ports of router, and the ASIC operates to drop data packets which are directed to the CPU of the router. This system and method operates to filter data packets which may be generated in attempts to hack in to control functions of a network device, and the operation does not require that the CPU analyze all received data packets in connection with determining access to the control functions of the router.

At the time of issuance and publication of this certificate, the patent remains subject to pending reexamination control number 95/001,811 filed Nov. 8, 2011. The claim content of the patent may be subsequently revised if a reexamination certificate issues from the reexamination proceeding.

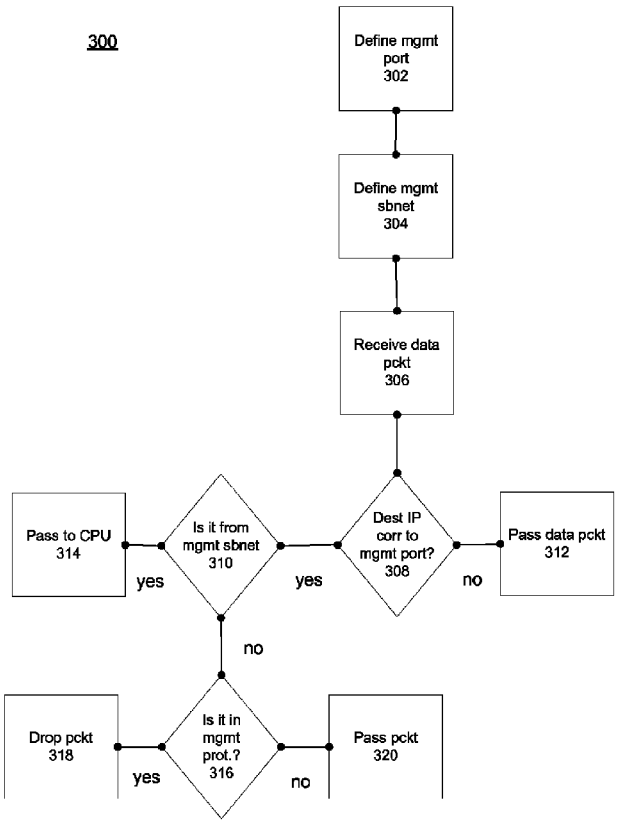

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1 and 11 is confirmed.

Claims 2-10 and 12-17 were not reexamined.

\* \* \* \* \*